United States Patent
Takanashi et al.

(10) Patent No.: US 10,683,444 B2
(45) Date of Patent: Jun. 16, 2020

(54) THERMALLY CONDUCTIVE COMPOSITION

(71) Applicant: Momentive Performance Materials Japan LLC, Minato-ku, Tokyo (JP)

(72) Inventors: Masanori Takanashi, Tokyo (JP); Daigo Hirakawa, Tokyo (JP)

(73) Assignee: MOMENTIVE PERFORMANCE MATERIALS JAPAN LLC, Minato-ku, Tokyo (JP)

( * ) Notice: Subject to any disclaimer, the term of this patent is extended or adjusted under 35 U.S.C. 154(b) by 0 days.

(21) Appl. No.: 15/574,638

(22) PCT Filed: May 18, 2016

(86) PCT No.: PCT/JP2016/064724
§ 371 (c)(1),
(2) Date: Nov. 16, 2017

(87) PCT Pub. No.: WO2016/190188
PCT Pub. Date: Dec. 1, 2016

(65) Prior Publication Data
US 2018/0127629 A1  May 10, 2018

(30) Foreign Application Priority Data
May 22, 2015 (JP) ................. 2015-104112

(51) Int. Cl.
| C08L 83/04 | (2006.01) |
| C09K 5/14 | (2006.01) |
| C08K 3/08 | (2006.01) |
| C08K 3/22 | (2006.01) |
| C08K 5/5415 | (2006.01) |
| C08K 7/16 | (2006.01) |

(52) U.S. Cl.
CPC ................. *C09K 5/14* (2013.01); *C08K 3/08* (2013.01); *C08K 3/22* (2013.01); *C08K 5/5415* (2013.01); *C08K 7/16* (2013.01); *C08L 83/04* (2013.01)

(58) Field of Classification Search
None
See application file for complete search history.

(56) References Cited

U.S. PATENT DOCUMENTS

| 5,008,307 | A | * | 4/1991 | Inomata | C08L 83/04 |
| | | | | | 523/220 |
| 5,194,649 | A | * | 3/1993 | Okawa | C07F 7/0896 |
| | | | | | 556/451 |
| 5,591,034 | A | * | 1/1997 | Ameen | H01L 23/3737 |
| | | | | | 257/E23.107 |
| 5,633,213 | A | * | 5/1997 | Aghajanian | C04B 35/652 |
| | | | | | 264/332 |
| 6,025,435 | A | * | 2/2000 | Yamakawa | C08L 83/04 |
| | | | | | 524/430 |
| 6,500,891 | B1 | * | 12/2002 | Kropp | C08K 3/22 |
| | | | | | 524/430 |
| 6,828,369 | B2 | * | 12/2004 | Takahashi | C08K 3/22 |
| | | | | | 257/E23.107 |
| 7,153,583 | B2 | * | 12/2006 | Azechi | C08L 83/04 |
| | | | | | 428/447 |
| 7,329,706 | B2 | * | 2/2008 | Fukui | C08L 83/04 |
| | | | | | 524/588 |
| 7,692,032 | B2 | * | 4/2010 | Hoshino | C08L 83/04 |
| | | | | | 556/450 |
| 8,106,119 | B2 | * | 1/2012 | Wang | C08K 3/013 |
| | | | | | 524/430 |
| 8,138,254 | B2 | * | 3/2012 | Fukui | C08L 83/04 |
| | | | | | 523/212 |
| 8,187,490 | B2 | * | 5/2012 | Tabei | C08L 83/04 |
| | | | | | 106/287.13 |
| 8,912,132 | B2 | | 12/2014 | Kato et al. | |
| 9,074,101 | B2 | * | 7/2015 | Tsubokawa | B82Y 30/00 |
| 2003/0049466 | A1 | * | 3/2003 | Yamada | C08K 3/08 |
| | | | | | 428/447 |
| 2006/0100336 | A1 | * | 5/2006 | Fukui | C08K 3/08 |
| | | | | | 524/430 |

(Continued)

FOREIGN PATENT DOCUMENTS

| CN | 101151326 A | 3/2008 |
| CN | 101962528 A | 2/2011 |

(Continued)

OTHER PUBLICATIONS

Machine translation of JP-2011089079, 10 pages, translation generated Oct. 2018 (Year: 2018).*
Machine translation of JP 2012-214612, translation generated Mar. 2019, 3 pages. (Year: 2019).*
Technical data sheet for spherical alumina (aluminabeads CB series), 1 page, 2019. (Year: 2019).*
Machine translation of JP-2000256558, 29 pages, translation generated Jul. 2019. (Year: 2019).*
Machine translation of JP 2010006923, 27 pages, translation generated Nov. 2019. (Year: 2019).*

(Continued)

*Primary Examiner* — Robert S Loewe
(74) *Attorney, Agent, or Firm* — Flynn Thiel, P.C.

(57) ABSTRACT

A thermally conductive composition is a thermally conductive composition including (A) a spherical thermally conductive filler, (B) an alkoxysilane compound or dimethylpolysiloxane, and (C) a polyorganosiloxane (not inclusive of the dimethylpolysiloxane of component (B)), wherein component (A) is a mixture formulated with specific ratios of fillers having different average particle sizes, the mixture being formulated with a filler having an average particle size of 50 μm or more in an amount of 30% by mass or more; component (B) and component (C) are included in a total amount of 1.5 to 35 parts by mass relative to 100 parts by mass of component (A); and a content ratio of component (C) in the total amount of component (B) and component (C) is 15 to 98% by mass.

5 Claims, No Drawings

(56) References Cited

U.S. PATENT DOCUMENTS

| | | | | |
|---|---|---|---|---|
| 2007/0042533 A1* | 2/2007 | Endo | ............ | C10M 169/04 438/118 |
| 2007/0185259 A1* | 8/2007 | Hoshino | ............ | C08L 83/04 524/588 |
| 2009/0127518 A1* | 5/2009 | Nagano | ............ | H01B 1/22 252/514 |
| 2011/0024675 A1* | 2/2011 | Endo | ............ | C09D 183/04 252/78.3 |
| 2011/0188213 A1* | 8/2011 | Domae | ............ | C08L 83/04 361/748 |
| 2012/0119137 A1* | 5/2012 | Tsuji | ............ | C09K 5/14 252/78.3 |
| 2015/0001439 A1* | 1/2015 | Tsuji | ............ | C09K 5/14 252/75 |
| 2015/0148273 A1* | 5/2015 | Matsumoto | ............ | C08L 83/04 508/139 |
| 2015/0357261 A1* | 12/2015 | Tsuji | ............ | C08K 3/08 257/712 |
| 2016/0060462 A1* | 3/2016 | Kitazawa | ............ | C08K 3/08 252/75 |
| 2016/0086713 A1* | 3/2016 | Iwata | ............ | C09K 5/14 336/55 |
| 2016/0096984 A1* | 4/2016 | Matsumoto | ............ | C09J 9/00 252/75 |

FOREIGN PATENT DOCUMENTS

| | | | | |
|---|---|---|---|---|
| CN | 102947430 A | | 2/2013 | |
| CN | 103214853 A | | 7/2013 | |
| JP | 62-043493 A | | 2/1987 | |
| JP | 11-145351 A | | 5/1999 | |
| JP | 2000256558 A | * | 9/2000 | ............ C08L 83/04 |
| JP | 2002-299533 A | | 10/2002 | |
| JP | 2003-176414 A | | 6/2003 | |
| JP | 2003-218296 A | | 7/2003 | |
| JP | 2003-301189 A | | 10/2003 | |
| JP | 2005-112961 A | | 4/2005 | |
| JP | 2007-099821 A | | 4/2007 | |
| JP | 2007-277406 A | | 10/2007 | |
| JP | 2008-184549 A | | 8/2008 | |
| JP | 2009-096961 A | | 5/2009 | |
| JP | 2009-221311 A | | 10/2009 | |
| JP | 2010-013563 A | | 1/2010 | |
| JP | 2010006923 A | * | 1/2010 | ............ C08L 83/07 |
| JP | 2010-126568 A | | 6/2010 | |
| JP | 2010-155870 A | | 7/2010 | |
| JP | 2011-089079 A | | 5/2011 | |
| JP | 2011-122000 A | | 6/2011 | |
| JP | 2012-214612 A | | 11/2012 | |
| JP | 2013-147600 A | | 8/2013 | |
| JP | 2014-208728 A | | 11/2014 | |
| WO | WO-2014185296 A1 | * | 11/2014 | ............ C09K 5/14 |

OTHER PUBLICATIONS

International Search Report for PCT/JP2016/064724 (2 pgs).
English translation of International Preliminary Report on Patentability for PCT/JP2016/064724, dated Nov. 28, 2017 (1 pg.).
English translation of Written Opinion of the International Searching Authority for PCT/JP2016/064724, dated Aug. 23, 2016 (8 pgs.).
Chinese Office Action with English Translation issued by the Chinese Patent Office for Chinese Application No. 201680029424.8, dated Mar. 13, 2020 (21 pages).

\* cited by examiner

THERMALLY CONDUCTIVE COMPOSITION

FIELD OF THE INVENTION

The present invention relates to a thermally conductive composition capable of being used as a heat dissipating material, and a heat dissipating material using the thermally conductive composition.

BACKGROUND OF THE INVENTION

Electronic devices are undergoing increasingly higher integration and higher speed-up year by year, and accordingly the demand for heat dissipating materials as the countermeasures coping with the generated heat has been enhanced.

JP-A 62-43493 describes an invention of a thermally conductive silicone grease having a good thermal conductivity and a good electrical insulation. The document describes use of a boron nitride having a particle size of 0.01 to 100 μm as a component imparting the thermal conductivity (p.2, in the lower section of the right column), and a boron nitride having a particle size of 1 to 5 μm is used in the Example.

JP-A 2003-176414 describes an invention of a thermally conductive silicone composition, and describes as a component imparting the thermal conductivity, (B) a low-melting-point metal powder having an average particle size of 0.1 to 100 μm, and preferably 20 to 50 μm (paragraph 0011), and (D) a filler (paragraph 0014).

JP-A 2003-218296 describes an invention of a silicone resin composition including a silicone resin and a thermally conductive filler, and describes as the thermally conductive filler, for example, a low-melting-point metal powder, and an aluminum powder, a zinc oxide powder, and an alumina powder, each having an average particle size of 0.1 to 100 μm, and preferably 20 to 50 μm (paragraphs 0017 to 0021).

JP-A 2003-301189 describes an invention of a heat dissipating silicone grease composition, and describes the use of a thermally conductive filler having an average particle size falling within a range of 0.1 to 100 μm, and preferably 1 to 20 μm (paragraphs 0012 and 0013).

JP-A 2005-112961 describes an invention of a curable organopolysiloxane composition, and describes the use of a thermally conductive filler having an average particle size of 0.1 to 100 μm, and preferably 1 to 20 μm (paragraphs 0030 to 0032)

JP-A 2007-99821 describes an invention of a thermally conductive silicone grease composition, and describes the use of powders having an average particle size of 0.1 to 10 μm, and preferably 0.2 to 8 μm, as a metal oxide powder or a metal nitride powder of component (B) in order to obtain a desired thermal conductivity (paragraphs 0016 and 0017).

JP-A 2008-184549 describes an invention of a method for producing a heat dissipating material. The invention uses as (D) a thermally conductive filler, a thermally conductive filler having an average particle size of 100 μm or less, and preferably 0.1 to 80 μm (paragraphs 0027 and 0028). In Example 1, an aluminum oxide (D-1) having an average particle size of 14 μm, an aluminum oxide (D-2) having an average particle size of 2 μm, and a zinc oxide (D-3) having an average particle size of 0.5 μm are used in combination.

JP-A 2009-96961 describes an invention of a thermally conductive silicone grease composition, and describes the use of (B-1) a thermally conductive filler having an average particle size of 12 to 100 μm (preferably 15 to 30 μm), and (B-2) a thermally conductive filler having an average particle size of 0.1 to 10 μm (preferably 0.3 to 5 μm) (claims, and paragraphs 0028 to 0030).

JP-A 2010-13563 describes an invention of a thermally conductive silicone grease, and states that (A) a thermally conductive inorganic filler preferably has an average particle size falling within a range of 0.1 to 100 μm, in particular, 1 to 70 μm (paragraph 0025). In the Examples, there are used B-1: a zinc oxide powder (amorphous, average particle size: 1.0 μm), B-2: an alumina powder (spherical, average particle size: 2.0 μm), and B-3: an aluminum powder (amorphous, average particle size: 7.0 μm).

JP-A 2010-126568 describes an invention of a silicone grease composition for heat dissipation, and states that (B) a thermally conductive inorganic filler is required to have an average particle size falling within a range of 0.1 to 100 μm, and preferably has an average particle size falling within a range of 0.5 to 50 μm.

In the Examples, there are used an alumina powder C-1: (average particle size: 10 μm, specific surface area: 1.5 $m^2/g$), an alumina powder C-2: (average particle size: 1 μm, specific surface area: 8 $m^2/g$), a zinc oxide powder C-3: (average particle size: 0.3 μm, specific surface area: 4 $m^2/g$), an aluminum powder C-4: (average particle size: 10 μm, specific surface area: 3 $m^2/g$), and an alumina powder C-5: (average particle size: 0.01 μm, specific surface area: 160 $m^2/g$).

JP-A 2011-122000 describes an invention of a silicone composition for a highly thermally conductive potting material, and describes the use of a thermally conductive filler having an average particle size of 1 to 100 μm, preferably 5 to 50 μm as (A) a thermally conductive filler (paragraph 0018). It is stated that when an alumina powder is used as (A) the thermally conductive filler, (B1) a spherical alumina having an average particle size of more than 5 μm to 50 μm or less, and (B2) a spherical or amorphous alumina having an average particle size of 0.1 μm to 5 μm are preferably used in combination (paragraph 0018).

JP-A 2013-147600 describes an invention of a thermally conductive silicone composition. It is stated that a thermally conductive filler being component (B) mainly includes alumina, and is composed of (C-i) an amorphous alumina having an average particle size of 10 to 30 μm, (C-ii) a spherical alumina having an average particle size of 30 to 85 μm, and (C-iii) an insulating inorganic filler having an average particle size of 0.1 to 6 μm (paragraph 0032). A combination of an amorphous alumina and a spherical alumina allows a specific effect to be obtained.

SUMMARY OF THE INVENTION

An object of the present invention is to provide a thermally conductive composition having a good thermal conductivity and being capable of being made to have a low viscosity, and a heat dissipating material using the thermally conductive composition.

A first embodiment of the present invention provides a thermally conductive composition including (A) a spherical thermally conductive filler and (B) an alkoxysilane compound or dimethylpolysiloxane, wherein component (A) is a mixture formulated with specific ratios of fillers having different average particle sizes, the mixture being formulated with a filler having an average particle size of 50 μm or more in an amount of 30% by mass or more; and component (B), the alkoxysilane compound or dimethylpolysiloxane, is included in an amount of 0.01 to 20 parts by mass relative to 100 parts by mass of component (A).

A second embodiment of the present invention provides a thermally conductive composition including (A) a spherical thermally conductive filler, (B) an alkoxysilane compound or dimethylpolysiloxane, and (C) a polyorganosiloxane (not inclusive of the dimethylpolysiloxane of component (B)), wherein component (A) is a mixture formulated with specific ratios of fillers having different average particle sizes, the mixture being formulated with a filler having an average particle size of 50 µm or more in an amount of 30% by mass or more; component (B) and component (C) are included in a total amount of 1.5 to 35 parts by mass relative to 100 parts by mass of component (A); and a content ratio of component (C) in the total amount of component (B) and component (C) is 15 to 98% by mass.

The present invention further provides a heat dissipating material using the composition according to the first or second embodiment.

The composition of the present invention has a high thermal conductivity, but is capable of being made to have a low viscosity, and accordingly is easy to apply to an application object when the composition is used as a heat dissipating material.

DESCRIPTION OF EMBODIMENTS

<Thermally Conductive Composition of First Embodiment>

The thermally conductive composition of the first embodiment of the present invention includes (A) a spherical thermally conductive filler and (B) an alkoxysilane compound or dimethylpolysiloxane.

Component (A)

Component (A) is a spherical thermally conductive filler, and does not include any amorphous thermally conductive filler. The spherical shape is not required to be a perfect sphere, but when a major axis and a minor axis are involved, the spherical shape means a shape approximately satisfying the ratio of major axis/minor axis=1.0±0.2.

The spherical thermally conductive filler of component (A) is a mixture formulated with specific ratios of fillers having different average particle sizes, and from the viewpoint of being capable of enhancing the thermal conductivity, the mixture is formulated with a filler having an average particle size of 50 µm or more in an amount of 30% by mass or more and preferably 35% by mass or more.

In one example, the spherical thermally conductive filler of component (A) is a mixture formulated with specific ratios of fillers having different average particle sizes, and the mixture is formulated with (A-1) a filler having an average particle size of 50 µm or more in an amount of 30% by mass or more, and preferably 35% by mass or more; and (A-2) a filler having an average particle size of 40 µm or less in an amount of less than 70% by mass, and preferably less than 65% by mass.

In another example, the spherical thermally conductive filler of component (A) is a mixture formulated with specific ratios of fillers having different average particle sizes, and the mixture is formulated with (A-1) a filler having an average particle size of 50 µm or more in an amount of 30 to 60% by mass, and preferably 35 to 55% by mass; (A-2) a filler having an average particle size of 40 µm or less, and preferably 8 to 25 µm in an amount of 15 to 30% by mass, and preferably 18 to 28% by mass; and (A-3) a filler having an average particle size of less than 8 µm as a balance (in total, 100% by mass).

The spherical thermally conductive filler of component (A) is not particularly limited as long as the filler is spherical; as the spherical thermally conductive filler of component (A), a filler selected from metal oxide powders, metal nitride powders and metal powders can be used. In an example, the spherical thermally conductive filler of component (A) is preferably selected from aluminum oxide, zinc oxide and aluminum, and is more preferably a spherical aluminum oxide powder. As the spherical thermally conductive filler of component (A), for example, the CB series (average particle size $d_{50}$=2 to 71 µm) of spherical alumina "Aluminabeads CB (registered trademark)" sold from Showa Denko K.K., and "Sumicorandom (registered trademark)" series (average particle size: 0.3 to 18 µm) sold from Sumitomo Chemical Co., Ltd. can be used.

Component (B)

The alkoxysilane compound of component (B) is preferably a compound having at least an alkoxysilyl group represented by the following general formula in one molecule: —$SiR^{11}_{3-a}(OR^{12})_a$ (II), wherein $R^{11}$ is an alkyl group having 1 to 6 carbon atoms, and preferably a methyl group; $R^{12}$ is an alkyl group having 1 to 6 carbon atoms, and preferably a methyl group; and a is 1, 2 or 3.

Examples of the alkoxysilane compound having the alkoxysilyl group represented by the general formula (II) may include the compound represented by the following general formula (II-1) and the compound represented by the following general formula (II-2):

Formula 1

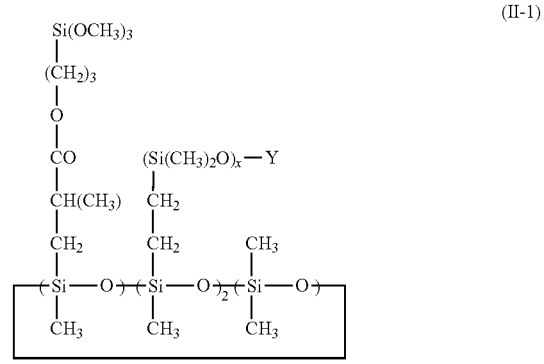

(II-1)

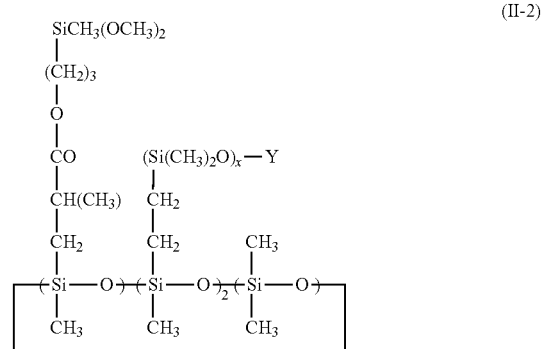

(II-2)

wherein
x = 10 to 500, and
y = Si(CH$_3$)$_2$CH = CH$_2$ or Si(CH$_3$)$_3$.

As the alkoxysilane compound of component (B), the compound represented by the following general formula (III) can also be used:

$$R^{21}_a R^{22}_b Si(OR^{23})_{4-a-b} \qquad (III)$$

wherein $R^{21}$ is independently an alkyl group having 6 to 15 carbon atoms; $R^{22}$ is independently an unsubstituted or substituted monovalent hydrocarbon group having 1 to 12 carbon atoms; $R^{23}$ is independently an alkyl group having 1 to 6 carbon atoms; a is an integer of 1 to 3; and b is an integer of 0 to 2, with the proviso that a+b is an integer of 1 to 3.

In the general formula (III), examples of the alkyl group represented by $R^{21}$ may include a hexyl group, an octyl group, a nonyl group, a decyl group, a dodecyl group, and a tetradecyl group. As the unsubstituted or substituted monovalent hydrocarbon group represented by $R^{22}$, preferable are unsubstituted or substituted alkyl groups having 1 to 3 carbon atoms such as a methyl group, an ethyl group, a propyl group, a chloromethyl group, a bromoethyl group, a 3,3,3-trifluoropropyl group, and a cyanoethyl group; and unsubstituted or substituted phenyl groups such as a phenyl group, a chlorophenyl group, and a fluorophenyl group. As the $R^{23}$, for example, preferable are, a methyl group, an ethyl group, a propyl group, a butyl group, and a hexyl group.

Examples of the dimethylpolysiloxane of component (B) may include a dimethyl polysiloxane in which one of the molecular chain terminals represented by the following general formula (IV) is blocked with a trialkoxysilyl group:

Formula IV

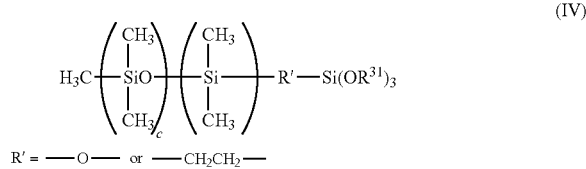

(IV)

wherein $R^{31}$ is independently an alkyl group having 1 to 6 carbon atoms; and c is an integer of 5 to 100, preferably 5 to 70, and particularly preferably 10 to 50.

As the alkyl group represented by $R^{31}$, for example, preferable are a methyl group, an ethyl group, a propyl group, a butyl group, and a hexyl group.

Further, as component (B), for example, a surface treatment agent (wetter) (paragraphs 0041 to 0048) of component (D) described in JP-A 2009-221311 can also be used.

The content of component (B) in the composition of the first embodiment is 0.01 to 20 parts by mass, preferably 0.1 to 10 parts by mass, and more preferably 1.0 to 5 parts by mass, relative to 100 parts by mass of component (A).

<Thermally Conductive Composition of Second Embodiment>

The thermally conductive composition of the second embodiment of the present invention further includes polyorganosiloxane of component (C), in addition to (A) the spherical thermally conductive filler and (B) the alkoxysilane compound or dimethylpolysiloxane. In the polyorganosiloxane of component (C), the dimethylpolysiloxane of component (B) is not included.

Component (C)

As the polyorganosiloxane of component (C), a polyorganosiloxane represented by the following average compositional formula (I) can be used:

In the formula, $R^1$ is an alkenyl group. The alkenyl group is preferably an alkenyl group having carbon atoms within a range of 2 to 8; examples of such an alkenyl group may include a vinyl group, an allyl group, a propenyl group, a 1-butenyl group, and a 1-hexenyl group; the alkenyl group is preferably a vinyl group. When the alkenyl group is included, preferably one or more alkenyl groups are included in one molecule, and preferably two or more alkenyl groups are included in one molecule. When one or more alkenyl groups are included in one molecule, component (C) can be regulated between a gel state and a rubber state. The alkenyl groups may be bonded either to silicon atoms at molecular chain terminals or to silicon atoms midway the molecular chain, or alternatively may be bonded to both of the above.

$R^2$ is a substituted or unsubstituted monovalent hydrocarbon group free from any aliphatic unsaturated bond. The substituted or unsubstituted monovalent hydrocarbon group free from aliphatic unsaturated bond is a group having 1 to 12 carbon atoms, and preferably 1 to 10 carbon atoms; examples of such a substituted or unsubstituted monovalent hydrocarbon group include: alkyl groups such as a methyl group, an ethyl group, a propyl group, an isopropyl group, a butyl group, a hexyl group, an octyl group, a decyl group, and a dodecyl group; cycloalkyl groups such as a cyclopentyl group, a cyclohexyl group, and a cyclobutyl group; aryl groups such as a phenyl group, a tolyl group, a xylyl group, and a naphthyl group; aralkyl groups such as a benzyl group, a phenylethyl group, and a phenylpropyl group; groups obtained by substituting part or the whole of the hydrogen atoms of these hydrocarbon groups with halogen atoms such as chlorine, fluorine and bromine atoms, or cyan groups, such as halogenated hydrocarbon groups such as a chloromethyl group, a trifluoropropyl group, a chlorophenyl group, a bromophenyl group, a dibromophenyl group, a tetrachlorophenyl group, a fluorophenyl group, and a difluorophenyl group, and such as cyanoalkyl groups such as an α-cyanoethyl group, a β-cyanopropyl group, and a γ-cyanopropyl groups. Among these, alkyl groups and aryl groups are preferable, and a methyl group and a phenyl group are more preferable.

a and b are positive numbers satisfying 0≤ a<3, 0<b<3, and 1<a+b<3, preferably numbers satisfying 0.0005≤ a≤1, 1.5≤b<2.4, 1.5<a+b<2.5, and more preferably numbers satisfying 0.001≤ a≤0.5, 1.8≤b≤2.1, 1.8<a+b≤2.2.

The molecular structure of component (C) is preferably a linear structure or a branched structure.

The viscosity of component (C) at 23° C. is preferably 0.01 to 10 Pa·s, and more preferably 0.02 to 1.0 Pa·s.

The contents of component (B) and component (C) in the composition of the second embodiment of the present invention are such that the total amount of component (B) and component (C) is 1.5 to 35 parts by mass, preferably 1.5 to 30 parts by mass, and more preferably 1.5 to 28 parts by mass, relative to 100 parts by mass of component (A). Component (B) and component (C) are formulated in such a way that the content ratio of component (C) in the total amount of component (B) and component (C) is 15 to 98% by mass, preferably 18 to 98% by mass, and more preferably 20 to 98% by mass.

The composition of the present invention can include, if necessary, a reaction inhibitor, a reinforcing silica, a flame retardancy-imparting agent, a heat resistance improver, a plasticizer, a colorant, an adhesion imparting agent, and a diluent, within the ranges not impairing the object of the present invention.

The compositions of the first and second embodiments of the present invention are grease-like (paste-like) compositions. When component (B) of the first embodiment of the present invention is the alkoxysilane compounds (II-1, 2) and Y=Si(CH$_3$)$_2$CH$_2$=CH$_2$, or when the same component (B) is used in the composition of the second embodiment, and the substituent of component (C) is selected, as described above, so as to include an unsaturated group in addition to the use of component (B) or in place of the use of component (B), by using the following component (D) and the following component (E) in combination, the hardness of the composition can be regulated between the gel-like composition and the rubber-like composition. Herein, when a rubber-like composition is prepared, the rubber-like composition involves compositions ranging from an elastic composition to a composition hard like a stone.

Component (D)

Component (D) is a polyorganohydrogensiloxane, and is a component to be a cross-linking agent for component (C). The polyorganohydrogensiloxane of component (D) has, in a molecule thereof, two or more, and preferably three or more hydrogen atoms bonded to silicon atoms. Such hydrogen atoms may be bonded either to silicon atoms at molecular chain terminals or to silicon atoms midway the molecular chain, or alternatively may be bonded to both of the above. Moreover, a polyorganohydrogensiloxane having hydrogen atoms bonded only to the silicon atoms at both terminals can be used in combination. The molecular structure of component (D) may be any of a linear, branched, cyclic or three-dimensional network structure, and these structures may be used each alone or in combinations of two or more thereof. The polyorganohydrogensiloxane of component (D) is a heretofore known product, and for example, component (B) described in JP-A 2008-184549 can be used.

Component (E)

Component (E) is a platinum-based catalyst, and a component to promote the curing after the kneading of component (C) and component (D). As component (E), heretofore known catalysts used for hydrosilylation reaction can be used. Examples of such catalysts include: platinum black, platinic chloride, chloroplatinic acid, a reaction product between chloroplatinic acid and a monohydric alcohol, complexes of chloroplatinic acid, olefins and vinylsiloxane, and platinum bisacetoacetate. The content of component (E) can be appropriately regulated according to the desired curing rate or the like, and is preferably 0.1 to 1000 ppm, in terms of the platinum element, relative to the total amount of component (C) and component (D).

When the composition of the present invention is a grease-like composition not including component (D) and component (E), the composition of the present invention can be obtained by mixing component (A) and component (B), and if necessary, further component (C) and other optional components, by using a mixer such as a planetary mixer. During the mixing, the mixing may be performed while heating in a range from 50 to 150° C., if necessary. Moreover, for uniform finish, a kneading operation is preferably performed under high shear force. As a kneading apparatus, for example, a triple roll mill, a colloid mill, and a sand grinder are available, and among these, the triple roll mill offers a preferable method.

When the composition of the present invention is a gel-like composition including component (D) and component (E), the composition can be obtained in the same manner as in the method for producing a heat dissipating material described in JP-A 2008-184549.

The heat dissipating material made of the composition of the present invention is a heat dissipating material made of an above-described thermally conductive composition. When the heat dissipating material made of the composition of the present invention is a grease-like material not including component (D) and component (E), the viscosity (the viscosity obtained by the measurement method described in Examples) preferably falls within a range from 10 to 1000 Pa·s, from the viewpoint of easiness in application to a heat-generating portion.

When a heat dissipating material made of a composition in which, as described above, component (B) of the first embodiment of the present invention is the alkoxysilane compounds (II-1, 2) and Y=Si(CH$_3$)$_2$CH$_2$=CH$_2$, or a heat dissipating material made of the composition of the second embodiment, is a rubber-like material including component (D) and component (E), the heat dissipating material preferably has a hardness of, for example, 5 or more as measured with a type E durometer (in accordance with JIS K6249).

The heat dissipating material made of the composition of the present invention has a thermal conductivity at 23° C., measured with a hot wire method, of 1.0 W/(m·K) or more and preferably 1.5 W/(m·K) or more. In order to enhance the heat dissipation effect by regulating the thermal conductivity, the content ratio of component (A) in the composition is preferably 80% by mass or more; according to the required thermal conductivity, the content ratio of component (A) can be increased.

The heat dissipating material of the present invention can be used as the heat dissipating material for PCs/servers mounting CPUs having large heat generation amounts, and additionally, as the heat dissipating materials for power modules, VLSIs, various electronic devices mounting optical components (optical pickups and LEDs), household appliances (DVD/HDD recorders (players), AV appliances such as FPDs), PC peripheral devices, home video game machines, automobiles, and industrial devices such as inverters and switched-mode power supplies. The heat dissipating material is allowed to have, for example, a grease-like form (paste-like form), a gel-like form and a rubber-like form.

Hereinafter, various embodiments of the present invention are described.

<1> A thermally conductive composition including (A) a spherical thermally conductive filler and (B) an alkoxysilane compound or dimethylpolysiloxane, wherein component (A) is a mixture formulated with specific ratios of fillers having different average particle sizes, the mixture being formulated with a filler having an average particle size of 50 μm or more in an amount of 30% by mass or more, and preferably 35% by mass or more; and component (B), the alkoxysilane compound or dimethylpolysiloxane, is included in an amount of 0.01 to 20 parts by mass, preferably 0.1 to 10 parts by mass, and more preferably 1.0 to 5 parts by mass, relative to 100 parts by mass of component (A).

<2> A thermally conductive composition including (A) a spherical thermally conductive filler, (B) an alkoxysilane compound or dimethylpolysiloxane, and (C) a polyorganosiloxane (not inclusive of the dimethylpolysiloxane of component (B)), wherein component (A) is a mixture formulated with specific ratios of fillers having different average particle sizes, the mixture being formulated with a filler having an average particle size of 50 μm or more in an amount of 30% by mass or more, and preferably 35% by mass or more;

component (B) and component (C) are included in a total amount of 1.5 to 35 parts by mass, and preferably 1.5 to 30 parts by mass, and more preferably 1.5 to 28 parts by mass, relative to 100 parts by mass of component (A); and a content ratio of component (C) in the total amount of component (B) and component (C) is 15 to 98% by mass, preferably 18 to 97% by mass, and more preferably 20 to 98% by mass.

<3> The thermally conductive composition according to <1> or <2>, wherein the spherical thermally conductive filler of component (A) is a mixture formulated with a filler having an average particle size of 50 μm or more in an amount of 30% by mass or more and preferably 35% by mass or more; and a filler having an average particle size of 40 μm or less in an amount of less than 70% by mass, and preferably less than 65% by mass.

<4> The thermally conductive composition according to <1> or <2>, wherein the spherical thermally conductive filler of component (A) is a mixture formulated with a filler having an average particle size of 50 μm or more in an amount of 30% by mass to 60% by mass, and preferably 35 to 55% by mass; a filler having an average particle size of 40 μm or less, and preferably an average particle size of 8 to 25 μm in an amount of 15 to 30% by mass, and preferably 18 to 28% by mass; and a filler having an average particle size of less than 8 μm as a balance.

<5> The thermally conductive composition according to any one of <1> to <4>, wherein the spherical thermally conductive filler of component (A) is selected from metal oxide powders and metal powders.

<6> The thermally conductive composition according to <5>, wherein the spherical thermally conductive filler of component (A) is selected from aluminum oxide, zinc oxide and aluminum.

<7> A heat dissipating material made of the thermally conductive composition according to any one of <1> to <6>.

<8> A method for producing a thermally conductive composition, which includes mixing, in 100 parts by mass of (A) a spherical thermally conductive filler, (B) an alkoxysilane compound or dimethylpolysiloxane in an amount of 0.01 to 20 parts by mass, preferably 0.1 to 10 parts by mass, and more preferably 1.0 to 5 parts by mass, wherein component (A) is a mixture formulated with specific ratios of fillers having different average particle sizes, the mixture being formulated with a filler having an average particle size of 50 μm or more in an amount of 30% by mass or more, and preferably 35% by mass or more.

<9> A method for producing a thermally conductive composition, which includes mixing in 100 parts by mass of (A) a spherical thermally conductive filler, (B) an alkoxysilane compound or dimethylpolysiloxane, and (C) a polyorganosiloxane (not inclusive of the dimethylpolysiloxane of component (B)) in a total amount of 1.5 to 35 parts by mass, preferably 1.5 to 30 parts by mass, and more preferably 1.5 to 28 parts by mass, wherein component (A) is a mixture formulated with specific ratios of fillers having different average particle sizes, the mixture being formulated with a filler having an average particle size of 50 μm or more in an amount of 30% by mass or more, and preferably 35% by mass or more; and a content ratio of component (C) in the total amount of component (B) and component (C) is 15 to 98% by mass, preferably 18 to 97% by mass, and more preferably 20 to 98% by mass.

<10> The composition, the heat dissipating material or the production method of any one of <1> to <9>, wherein component (B) is an alkoxysilane compound having the alkoxysilyl group of the general formula (II).

<11> The composition, the heat dissipating material or the production method of <10>, wherein component (B) is the compound of the general formula (II-1) or the general formula (II-2).

<12> The composition, the heat dissipating material or the production method of any one of <1> to <9>, wherein component (B) is the compound represented by the general formula (III).

<13> The composition, the heat dissipating material or the production method of any one of <1> to <9>, wherein component (B) is the dimethylpolysiloxane represented by the general formula (IV).

<14> The composition, the heat dissipating material or the production method of any one of <1> to <9>, wherein component (C) is the polyorganosiloxane represented by the average compositional formula (I).

<15> The composition, the heat dissipating material or the production method of any one of <1> to <9>, further including a polyorganohydrogensiloxane as component (D) and a platinum-based catalyst as component (E).

EXAMPLES

Examples 1 to 10

Components (A) and (B), or components (A), (B) and (C) shown in Table 1 were placed in a planetary mixer (manufactured by Dalton Corporation), stirred and mixed at room temperature for 1 hour, and further stirred and mixed at 120° C. for 1 hour, to obtain a thermally conductive composition. The amounts of components (B) and (C) are given in terms of parts by mass relative to 100 parts by mass of component (A). The average particle size of component (A), and the viscosity and the thermal conductivity of the composition were measured by the following methods. The results thus obtained are shown in Table 1.

Average Particle Size

The average particle size (median diameter $d_{50}$) was measured by the Coulter counter method.

Viscosity 1

In accordance with JIS K6249. The viscosity with a rotary viscometer rotor No. 4, at a number of rotations of 60 rpm, and a measurement time of 1 minute is shown.

Viscosity 2

In accordance with JIS K6249. The viscosity with a rotary viscometer rotor No. 7, at a number of rotations of 20 rpm, and a measurement time of 1 minute is shown.

Thermal Conductivity

The thermal conductivity was measured at 23° C., according to a hot wire method, by using a thermal conductivity meter (QTM-500, manufactured by Kyoto Electronics Manufacturing Co., Ltd.).

TABLE 1

|   |   |   | \multicolumn{10}{c}{Examples} |
|---|---|---|---|---|---|---|---|---|---|---|---|---|
|   |   |   | 1 | 2 | 3 | 4 | 5 | 6 | 7 | 8 | 9 | 10 |
| (A) | (A-1) | 100 μm | 45.0 | 45.0 | 45.0 | 45.0 | 45.0 | 45.0 | 45.0 | 45.0 | 45.0 | 45.0 |
|   | (A-11) | 20 μm | 22.5 | 22.5 | 22.5 | 22.5 | 22.5 | 22.5 | 22.5 | 22.5 | 22.5 | 22.5 |
|   | (A-21) | 3 μm | 22.5 | 22.5 | 22.5 | 22.5 | 22.5 | 22.5 | 22.5 | 22.5 | 22.5 | 22.5 |
|   | (A-22) | 0.4 μm | 10.0 | 10.0 | 10.0 | 10.0 | 10.0 | 10.0 | 10.0 | 10.0 | 10.0 | 10.0 |
|   | (A) Total (% by mass) |   | 100 | 100 | 100 | 100 | 100 | 100 | 100 | 100 | 100 | 100 |
| (B) | Surface treatment agent |   | 5.0 | 0.5 | 1.0 | 1.0 | 1.2 | 1.2 | 1.2 | 2.0 | 2.5 | 3.8 |
| (C) | Polyorganosiloxane |   | — | 4.5 | 3.0 | 2.8 | 3.8 | 23.8 | 11.8 | 6.1 | 2.5 | 1.2 |
|   | Content of component (A) in composition (% by mass) |   | 95.2 | 95.2 | 96.2 | 96.4 | 95.2 | 80.0 | 88.5 | 92.5 | 95.2 | 95.2 |
| Measurement Items | Viscosity 1 (Pa · s) |   | 84.8 | 71.6 | 250.0 | Measurement was impossible/ Paste-like state | 51.8 | 0.3 | 1.6 | 7.0 | 61.2 | 69.4 |
|   | Viscosity 2 (Pa · s) |   |   |   | 115.2 |   | 57.6 |   |   |   |   |   |
|   | Thermal conductivity [W/(m · K)] |   | 6.0 | 6.0 | 7.5 | 7.9 | 6.0 | 1.2 | 2.3 | 3.7 | 6.0 | 6.0 |

Components (A)
(A-1): Spherical alumina (Alumina Beads) of Showa Denko K.K., average particle size: 100 μm
(A-11): Spherical alumina (Alumina Beads) of Showa Denko K.K., average particle size: 20 μm
(A-21): Roundish alumina (Sumicorandom) of Sumitomo Chemical Co., Ltd., average particle size: 3 μm
(A-22): Roundish alumina (Sumicorandom) of Sumitomo Chemical Co., Ltd., average particle size: 0.4 μm
Component (B): Alkoxysilane (in general formula (II-1), x: 20, Y: Si(CH$_3$)2CH=CH$_2$)
Component (C): Polyorganosiloxane (60 cSt) with both terminals blocked with dimethylvinylsilyl groups Examples 11 to 13

Components (A) to (C) shown in Table 2 were placed in a planetary mixer (manufactured by Dalton Corporation), stirred and mixed at room temperature for 1 hour, and further stirred and mixed at 120° C. for 1 hour, to obtain a thermally conductive composition. The amounts of components (B) and (C) are given in terms of parts by mass relative to 100 parts by mass of component (A). The viscosity and the thermal conductivity of each of the compositions were measured. The results thus obtained are shown in Table 2.

TABLE 2

|   |   |   | Example 11 | Example 12 | Example 13 |
|---|---|---|---|---|---|
| (A) | (A-2) | 70 μm | 36.6 | 36.6 | 36.6 |
|   | (A-11) | 20 μm | 25.8 | 25.8 | 25.8 |
|   | (A-21) | 3 μm | 25.8 | 25.8 | 25.8 |
|   | (A-22) | 0.4 μm | 11.8 | 11.8 | 11.8 |
|   | (A) Total (% by mass) |   | 100 | 100 | 100 |
| (B) | Surface treatment agent |   | 4.0 | 2.5 | 2.0 |
| (C) | Polyorganosiloxane |   | 4.1 | 2.5 | 2.0 |
|   | Content of component (A) in composition (% by mass) |   | 92.5 | 95.2 | 96.2 |
| Measurement Items | Viscosity 2 (Pa · s) |   | 6.6 | 55.0 | 400.0 |
|   | Thermal conductivity [W/(m · K)] |   | 3.1 | 5.4 | 6.8 |

(A-2): Spherical alumina (Alumina Beads) of Showa Denko K.K., average particle size: 70 μm Examples 14 to 16

Components (A) to (C) (parts by mass) shown in Table 3 were placed in a planetary mixer (manufactured by Dalton Corporation), stirred and mixed at room temperature for 1 hour, and further stirred and mixed at 120° C. for 1 hour to obtain a thermally conductive composition.

The amounts of components (B) and (C) are given in terms of parts by mass relative to 100 parts by mass of component (A).

The viscosity and the thermal conductivity of each of the compositions were measured. The results thus obtained are shown in Table 3.

TABLE 3

|   |   |   | Example 14 | Example 15 | Example 16 |
|---|---|---|---|---|---|
| (A) | (A-3) | 50 μm | 50.0 | 50.0 | 50.0 |
|   | (A-12) | 10 μm | 25.0 | 25.0 | 25.0 |

TABLE 3-continued

|  |  |  | Example 14 | Example 15 | Example 16 |
|---|---|---|---|---|---|
|  | (A-21) | 3 μm | 20.0 | 20.0 | 20.0 |
|  | (A-22) | 0.4 μm | 5.0 | 5.0 | 5.0 |
|  | (A) Total (% by mass) |  | 100 | 100 | 100 |
| (B) | Surface treatment agent |  | 4.0 | 2.5 | 2.0 |
| (C) | Polyorganosiloxane |  | 4.1 | 2.5 | 2.0 |
|  | Content of component (A) in composition (% by mass) |  | 92.5 | 95.2 | 96.2 |
| Measurement items | Viscosity 2 (Pa · s) |  | 12.0 | 169.4 | Measurement was impossible/ Paste-like state |
|  | Thermal conductivity [W/(m · K)] |  | 3.0 | 5.5 | 7.1 |

(A-3): Spherical alumina (Alumina Beads) of Showa Denko K.K., average particle size: 50 μm
(A-12): Spherical alumina (Alumina Beads) of Showa Denko K.K., average particle size: 10 μm Comparative Examples 1 to 3

Components (A) to (C) (parts by mass) were placed in a planetary mixer (manufactured by Dalton Corporation), stirred and mixed at room temperature for 1 hour, and further stirred and mixed at 120° C. for 1 hour to obtain a thermally conductive composition for comparison. The amounts of components (B) and (C) are given in terms of parts by mass relative to 100 parts by mass of component (A). The viscosity and the thermal conductivity of each of the compositions were measured. The results thus obtained are shown in Table 4.

TABLE 4

|  |  |  | Comparative Example 1 | Comparative Example 2 | Comparative Example 3 |
|---|---|---|---|---|---|
| (A) | (A-11) | 20 μm | 58.3 | 58.3 | 58.3 |
|  | (A-21) | 3 μm | 29.2 | 29.2 | 29.2 |
|  | (A-22) | 0.4 μm | 12.5 | 12.5 | 12.5 |
|  | (A) Total (% by mass) |  | 100 | 100 | 100 |
| (B) | Surface treatment agent |  | 4.0 | 2.5 | 2.0 |
| (C) | Polyorganosiloxane |  | 4.1 | 2.5 | 2.0 |
|  | Content of component (A) in composition (% by mass) |  | 92.5 | 95.2 | 96.2 |
| Measurement items | Viscosity 2 (Pa · s) |  | 8.0 | 62.2 | Measurement was impossible/ Paste-like state |
|  | Thermal conductivity [W/(m · K)] |  | 2.7 | 4.3 | 6.1 |

From a comparison between Examples in Table 1 to Table 3 and Comparative Examples in Table 4, it was verified that the compositions of Examples were large in the proportion of the spherical alumina having a large particle size, and accordingly were able to have a high thermal conductivity and low viscosity. In addition, from a comparison between Examples in Table 1 to Table 3 and Comparative Examples of Table 4, it was also verified that the viscosity was able to be made lower when the thermal conductivity was comparable.

Example 8 (including alumina of 100 μm), Example 11 (including alumina of 70 μm), Example 14 (including alumina of 50 μm) and Comparative Example 1 (including alumina of 0.4 to 20 μm) were all the same in the alumina content of 92.5% by mass in the composition; however, the thermal conductivity decreased in the order of Example 8> Example 11> Example 14> Comparative Example 1. From a comparison of Examples and Comparative Examples having the same alumina content, the thermal conductivities of Examples including alumina having larger average particle sizes were higher.

These results are unable to be anticipated by the conventional technology that has enhanced the thermal conductivity by using thermally conductive inorganic fillers small in average particle size.

INDUSTRIAL APPLICABILITY

The thermally conductive composition of the present invention can be used as heat dissipating materials for various devices having heat-generating portions such as electronic devices such as personal computers.

The invention claimed is:

1. A thermally conductive composition comprising (A) a spherical thermally conductive filler, (B) an alkoxysilane compound represented by at least one of the following formulas (II-1) and (II-2)

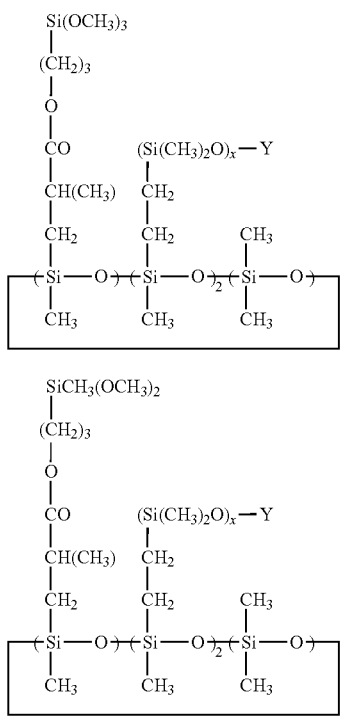

(II-1)

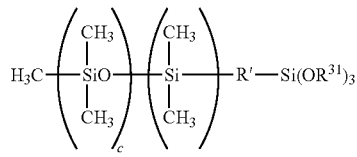

(II-2)

wherein
x=10 to 500, and
Y=Si(CH₃)₂CH=CH₂ or Si(CH₃)₃, and
(C) a polyorganosiloxane, not inclusive of a dimethylpolysiloxane of the following formula (IV), $$H_3C\left(\begin{array}{c}CH_3\\|\\SiO\\|\\CH_3\end{array}\right)_c\left(\begin{array}{c}CH_3\\|\\Si\\|\\CH_3\end{array}\right)R'-Si(OR^{31})_3$$ (IV)

wherein
R'=—O— or —CH₂CH₂—, and
$R^{31}$ is independently an alkyl group having 1 to 6 carbon atoms, and
c is an integer of 5 to 100;
wherein component (A) is a mixture formulated with specific ratios of fillers having different average particle sizes, the mixture being formulated with a filler having an average particle size of 50 μm or more in an amount of 30% by mass or more;
component (B) and component (C) are included in a total amount of 1.5 to 35 parts by mass relative to 100 parts by mass of component (A);
a content ratio of component (C) in the total amount of component (B) and component (C) is 24 to 90% by mass;
the spherical thermally conductive filler of component (A) is a mixture formulated with a filler having an average particle size of 50 μm or more in an amount of 30% by mass or more and a filler having an average particle size of 40 μm or less in an amount of less than 70% by mass; and
the spherical thermally conductive filler of component (A) is selected from metal oxide powders and metal powders.

2. The thermally conductive composition according to claim 1, wherein the spherical thermally conductive filler of component (A) is a mixture formulated with a filler having an average particle size of 50 μm or more in an amount of 30 to 60% by mass; a filler having an average particle size of 8 to 25 μm in an amount of 15 to 30% by mass; and a filler having an average particle size of less than 8 μm as a balance.

3. The thermally conductive composition according to claim 1, wherein the spherical thermally conductive filler of component (A) is selected from aluminum oxide, zinc oxide and aluminum.

4. A heat dissipating material consisting of the thermally conductive composition according to claim 1.

5. The thermally conductive composition according to claim 1, wherein component (B), the alkoxysilane compound, is represented by formula (II-2).

* * * * *